United States Patent [19]
Van Uijen et al.

[11] Patent Number: 5,442,619
[45] Date of Patent: Aug. 15, 1995

[54] ERASABLE OPTICAL RECORDING MEDIUM WITH A REVERSIBLE LIGHT ABSORPTION LAYER

[75] Inventors: Cornelis M. J. Van Uijen; Adrianus P. J. M. Jongenelis, both of Eindhoven, Netherlands

[73] Assignee: U. S. Philips Corporation, New York, N.Y.

[21] Appl. No.: 197,046

[22] Filed: Feb. 16, 1994

[30] Foreign Application Priority Data

Feb. 18, 1993 [EP] European Pat. Off. ............ 93200466

[51] Int. Cl.$^6$ ................................................ G11B 7/26
[52] U.S. Cl. .................................. 369/275.2; 369/100; 369/284; 369/288; 428/913; 430/945
[58] Field of Search .................... 369/275.2, 100, 284, 369/288; 430/945, 495, 864, 270, 496; 428/64, 65, 411.1, 688, 913

[56] References Cited

U.S. PATENT DOCUMENTS

| | | | |
|---|---|---|---|
| 4,651,172 | 3/1987 | Watanabe et al. | 428/913 |
| 5,242,784 | 9/1993 | Chen et al. | 369/275.2 |
| 5,270,149 | 12/1993 | Iselborn et al. | 430/270 |
| 5,346,740 | 9/1994 | Ohno et al. | 428/64 |

FOREIGN PATENT DOCUMENTS

| | | |
|---|---|---|
| 0352105 | 1/1990 | European Pat. Off. . |
| 0549024 | 6/1993 | European Pat. Off. . |

*Primary Examiner*—Georgia Y. Epps
*Assistant Examiner*—Kim-Kwok Chu
*Attorney, Agent, or Firm*—David R. Treacy

[57] ABSTRACT

An optical information carrier comprising a substrate, an auxiliary layer bounded by dielectric layers, a thin reflection layer, a dielectric layer, a phase-change layer, a dielectric layer, a tight metal reflection layer and a protective layer. The information carrier is recordable and erasable by a laser-light beam and can be played in a conventional CD player. The auxiliary layer consists of selenium or AlGaAs, and has the property that the absorption increases substantially at temperatures above 70° C. An information carrier comprising this auxiliary layer can be recorded with a lower laser power as compared to information carrier which does not comprise the auxiliary layer.

12 Claims, 1 Drawing Sheet

ERASABLE OPTICAL RECORDING MEDIUM WITH A REVERSIBLE LIGHT ABSORPTION LAYER

BACKGROUND OF THE INVENTION

The invention relates to an optical information carrier for inscribing, reading and erasing information by means of a laser-light beam, said optical information carrier comprising a transparent substrate having a servo track and a stack of layers, which stack comprises at least one recording layer of a phase-change material and at least one reflection layer of metal.

Known optical information careers, such as the Compact Disc (CD), Compact Disc Read-Only-Memory (CD-ROM) and Laser Vision (LV) are provided with information by the manufacturer and can only be read by the user by means of commercially available playback equipment. Other information carriers can be recorded once (CD-R) by the user. A information carrier which is recordable and erasable by the user and which is readable in a standard CD player could be used for many applications. A special recording/erase device is used for recording and erasing. Audio or data information can be recorded in the information carrier by the user himself. After an erasing step, new information can be recorded in the information carrier.

A prerequisite for reading a recordable and erasable information carrier in a standard CD player is that said information carrier is compatible with said CD player, i.e. it must comply with the industrial standard for CD systems, hereinafter referred to as CD-industrial standard. This means, among other things, that the reflection $R_H$ of unrecorded areas of the information carrier and the modulation must have a specific minimum value. When a recorded information carrier is read by means of a focused laser-light beam, reflection differences and/or optical path-length differences bring about a modulated laser-light beam which is subsequently converted by a detector into a modulated photocurrent in accordance with the coded, recorded digital information. The modulated photocurrent is a HF signal whose lowest fundamental frequency is 196 kHz. The peak-to-peak value of the photocurrent is designated $I_{11}$ and the top level of the HF signal associated with 196 kHz is designated $I_{top}$. The modulation is defined as $I_{11}/I_{top}$ and must be at least 0.6 according to the above-mentioned CD-industrial standard. The modulated photocurrent is caused by reflection differences and/or optical path-length differences between recorded and unrecorded areas of the information carrier. Information carriers whose modulation is based only on reflection differences must have a minimal optical contrast in order to attain the required modulation of 0.6. The optical contrast C is defined as:

$$C = 100(R_H - R_L)/R_H$$

In this equation, $R_H$ has the above-mentioned meaning and $R_L$ is the reflection of recorded areas (bits) of the information carrier. In practice, the modulation is lower than the optical contrast due to the size of the laser spot. This means that, in order to meet the modulation requirement of 0.6, the optical contrast C must be higher than 60%. The reflection requirement $R_H$ of unrecorded areas is based on a laser wavelength of 780 nm±10 nm. For a perpendicularly incident, parallel laser-light beam of the above wavelength, the reflection of the substrate surface (approximately 4%) also being measured, $R_H$ must be at least 70%. In the case of a focused laser-light beam, as used in a CD player, a reflection value $R_H$ of minimally 65% is sufficient, i.e. such a information carrier can be played in a standard CD player and is compatible therewith.

A known type of optical information carder has a recording layer of a so-called phase-change material. By locally heating said recording layer with a focused laser-light beam and subsequently cooling it, the state of crystallization of these materials is changed at the location of the laser spot and a readable bit is formed. Dependent upon the material of the recording layer, amorphous material changes to crystalline material or conversely. Conversion of a crystalline phase to another crystalline phase is also possible. The recording layer is, for example, crystalline and has the property that incident laser light is absorbed. During recording information, the information carrier is rotated and exposed to a focused laser-light beam which is modulated in accordance with the information to be inscribed. By virtue thereof, amorphous information bits are formed in the exposed areas of the recording layer which remains crystalline in the unexposed areas. The crystalline material has other optical properties than the amorphous material, so that the recorded information can be read in reflection as an optical contrast by means of a low-power, focused laser-light beam. In some phase-change materials, the amorphous areas can be reconverted into crystalline areas, or conversely, by heating, so that the recorded information is erased. Subsequently, new information can again be recorded in the recording layer.

It has been found to be very difficult to manufacture a recordable information career which meets the requirements of the so-called CD-industrial standard. The reflection and contrast of the known phase-change materials are too low, so that, without further treatment, said materials are unsuitable for use in a information carrier which is compatible with the CD player.

An information carrier of the type mentioned in the opening paragraph is known from European Patent Application EP-A-352105 to which U.S. Pat. No. 5,144,618 corresponds. The known information carrier of the phase-change type consists of a substrate which is provided with a spiral-shaped servo track which carries a stack of layers consisting of a recording layer of an InSb or TeGe alloy, a dielectric layer of, for example, ZnS and a reflection layer of, for example, Au. In a preferred embodiment of the known information carrier, the reflections amount to 72% and 38% for the unrecorded and the recorded areas, respectively. Thus, the optical contrast C of the known information carrier is (72−38)/72=47%. The measured optical contrast and hence the modulation which, as described above, is lower than the optical contrast do not comply with said CD-industrial standard (modulation>0.6).

In the non-prepublished European Patent Application 92203773.4, filed by the Applicant of the present invention, a description is given of a manner of increasing the contrast of such a information carrier while retaining the high initial reflection, so that said information carrier can comply with the CD-industrial standard. To this end, it is proposed to provide the stack with an optically non-tight reflection layer which faces the substrate. Preferably, the stack has an MIPIM layer structure, where M is a metal layer, I a dielectric layer and P a phase-change recording layer. Viewed from the substrate, the described information carrier comprises, for example, a thin Au reflection layer, a $Ta_2O_5$ dielectric layer, a (write once) GeTe recording layer, a $Ta_2O_5$ dielectric layer and an optically tight Au layer. Due to interference effects, both the initial reflection and the contrast of the information carrier are increased. For said layer structure, the reflections of the unrecorded and recorded areas are 70% and 12%, respectively. Thus, the optical contrast C is 82% and hence complies with the CD-industrial standard.

A problem of the recorded information carrier which complies with the CD standard is, however, that the absorption of the laser-light beam in an unrecorded area can maximally amount to 35% due to the fact that the reflection of the unrecorded areas must be at least 65%. Consequently, the write-sensitivity of the information carrier is so small that an unusually large laser power is required for the write process.

SUMMARY OF THE INVENTION

It is an object of the invention to provide, inter alia, a recordable and erasable optical information carrier, termed CD-E (erasable), which complies with the CD-industrial standard and which additionally has an improved write- sensitivity, i.e., which can be recorded with a smaller laser power.

According to the invention, this object is achieved by an optical information carrier as described in the opening paragraph, which is characterized in that the stack also comprises at least one auxiliary layer having the property that the light absorption has a reversible, temperature-dependent character, so that at temperatures below 70° C. the light absorption of the auxiliary layer is zero or substantially zero and at temperatures above 70° C. the light absorption of the stack increases to more than 35%. The invention is based on the insight that the CD requirements as regards reflection and modulation of the information carrier apply only for temperatures between −40° C. and +70° C., i.e. in the operating range of the CD system. At temperatures above +70° C., a drastic decrease in reflection and hence a drastic increase in absorption are permitted. This effect is achieved if the optical properties of the entire stack of layers of the information carrier are strongly temperature-dependent above +70° C. A substantial decrease in reflection of the information carrier as the temperature increases can be realised, inter alia, if one or more layers of the stack are subject to a phase transition at a temperature above +70° C. Examples of a phase transition are the transition from the ordered state to the disordered state, such as melting, or the transition from crystalline to amorphous and the transition from the liquid-crystalline phase to the isotropic phase. The transition from crystalline to crystalline is also possible. Said transitions can also take place in the opposite direction. According to the invention, the layer which exhibits a phase transition, hereinafter termed auxiliary layer, is located in a position where most laser light is incident on it, preferably between the stack and the substrate. When the temperature decreases to below 70° C., the original, optical state must be restored. Frequent switching between, for example, the solid and the liquid phase must be possible. The increase in write-sensitivity which can be obtained in this manner depends on the absorption increase to be attained. An absorption of 35% requires a writing power of the laser of, for example, 30 mW. An absorption increase up to 70% then requires 15 mW. To meet the reflection and modulation requirements of the CD-industrial standard, the absorption of the auxiliary layer must be zero or substantially zero at room temperature (i.e. at temperatures below 70° C.).

In an embodiment of the information carrier in accordance with the invention, the auxiliary layer comprises selenium (Se). The optical properties of selenium are governed by temperature. At room temperature and temperatures up to 70° C. selenium is substantially non-absorbent at the laser wavelength used. Above the melting point of selenium (217° C.) the auxiliary layer is sufficiently absorbent. If a selenium auxiliary layer is used, the reflection of the information carrier decreases drastically above the melting point of selenium. During recording or erasing with a laser-light beam, the temperature of the information carrier rises to, for example, 600° C. and the selenium auxiliary layer melts. This causes a substantial increase in absorption, so that the write process can be carried out with a lower laser power. After cooling, the selenium auxiliary layer solidifies and its absorption becomes substantially zero again. The reflection of the erased information career and hence of the unrecorded areas increases again to more than 65% and, hence, satisfies the requirement of the CD-industrial standard.

In a preferred embodiment of the information carrier in accordance with the invention, the auxiliary layer comprises selenium to which 1-6 at. % of tellurium is added. Said addition causes the absorption coefficient k of the auxiliary layer to be further increased in the molten phase. In the solid phase, the absorption coefficient k of a selenium layer comprising 3 at. % of tellurium is small (0.038) and increases to 0.14 in the molten phase. A suitable choice of the thickness of the auxiliary layer enables an absorption increase of the auxiliary layer and the other layers of the stack to be attained, which ranges from 35% at room temperature to 55% in the hot state (approximately 250° C.), as exists during recording or erasing. By virtue thereof, the laser power necessary for recording or erasing can be reduced by approximately 25%.

In another embodiment of the optical information carrier in accordance with the invention, the auxiliary layer comprises $Al_xGa_{1-x}As$, where $x=0.01-0.4$ (often referred to as AlGaAs). A property of this and other semi-conducting materials is that the spectral absorption band shifts with temperature. The absorption band of AlGaAs shifts approximately 40 nm per 100° C. In addition, the absorption of AlGaAs at room temperature can be adjusted so as to be substantially equal to zero for the required laser wavelength by blending GaAs with the proper concentration of Al. In this manner, a change of the absorption coefficient k of from 0.0006 to 0.06 at a temperature increase of 200° C. can be attained at the desired wavelength. This material has the advantage that its absorption at room temperature is lower than that of Se comprising a few per cent of Te. This has a favourable effect on the optical contrast and hence on the modulation. An increased absorption at temperatures above 70° C. can be obtained by choosing a suitable AlGaAs layer thickness. For a 190 nm thick auxiliary layer of AlGaAs, the combined absorption of the auxiliary layer and the recording layer can increase from 30% to 48% at a temperature increase of 200° C.

In a preferred embodiment of the information carrier in accordance with the invention, the auxiliary layer is bounded by one or more dielectric layers. By virtue of the presence of dielectric layers it is prevented that the auxiliary layer directly contacts the substrate and/or the metal reflection layer, so that possible undesired diffusion effects are precluded. Besides, the dielectric layers may have a thickness such that they serve as interference layers to increase reflection.

The recording layer comprises a phase-change material which exhibits, for example, a crystalline-amorphous phase transition. During recording, amorphous information bits are formed in an otherwise crystalline recording layer. The phase-change materials used are reversible, so that the recorded information can be erased after which the material can be recorded again. Known materials of this type are the alloys of In-Se, In-Se-Sb, In-Sb-Te, Te-Ge, Te-Se-Sb, Te-Ge-Sb and Te-Ge-Se-Sb. If a recording layer of such a material is used in an information carrier in accordance with the invention, an recordable and erasable information carrier which is CD compatible (CD-E) is obtained.

The simplest embodiment of the information carrier in accordance with the invention has the following structure: SPHM, where S denotes the substrate, P denotes the recording layer, H denotes the auxiliary layer, whether or not bounded by one or more dielectric layers, and M denotes the metal reflection layer. In another embodiment a dielectric layer I is present between the recording layer and the metal reflection layer, so that the following structure is obtained: SHPIM. The thickness of the dielectric layer may be such that said layer serves as an interference layer to increase the optical contrast. The auxiliary layer H may also be located elsewhere in the stack.

In a preferred embodiment of the information carrier a second reflection layer M' and a second dielectric layer is located between the substrate and the recording layer, said second dielectric layer being adjacent to the recording layer. The information carrier has the following structure: SHM'IPIM. The auxiliary layer H, whether or not bounded by dielectric layers, may also be located elsewhere in the stack. A variant is, for example, SM'HPIM, where H is bounded by two dielectric layers. As described in the above-mentioned non-prepublished European Patent Application 92203773.4, filed by the applicant of the present invention, this results in a higher reflection and/or a higher optical contrast of the information carder. The reflection layer M' which is situated on the substrate side may consist of a metal or metal alloy of the elements Au, Al, Cu and Ag. Said reflection layer M' is optically non-tight and has a transmission coefficient in excess of, for example, 0.2. The reflection layer M' may alternatively be a dielectric reflector consisting of a stack of dielectric layers having alternately a high and a low refractive index, for example $Ta_2O_5$ and $SiO_2$, respectively. The auxiliary layer H may form past of the layer stack of the dielectric reflector M'.

The reflection layer M on the outside of the information carrier is preferably an optically tight metal layer of, for example, a metal or metal alloy of the elements Au, Al, Cu or Ag, so that the reflection layer transmits as little laser light as possible and, hence, as much laser light as possible is used for reading and the reflection of the information carrier is as high as possible. By adding extra dielectric layers as interference layers, both the reflection and the contrast are increased. A possible structure is, for example, SLM'IPIM, which layer stack also comprises the auxiliary layer H. Also in this structure, the auxiliary layer H may form part of the layer stack of the dielectric reflector M'.

As can be derived from the foregoing, the designer of the information career has considerable latitude in how to optimize the optical properties. However, it must be borne in mind that both P and the metal reflector M (respectively M') as well as M and M' must not directly border on each other.

For the dielectric layers, use can be made of the customary materials, such as $SiO_2$, $TiO_2$, $Si_3N_4$, ZnS, AlN or $Ta_2O_5$. Mixtures of said materials, such as mixtures of ZnS and $SiO_2$, can alternatively be used.

The substrate of the information carrier is at least transparent to the laser wavelength of 780 nm±10 nm used and consists of, for example, polycarbonate, polymethyl methacrylate (PMMA) or glass. The substrate must also be transparent to the laser wavelength used to record and erase. In accordance with the CD-industrial standard, the thickness of the substrate is 1.2 mm and the diameter is 120 mm.

The surface of the substrate is provided with an optically scannable servotrack on the side of the recording layer. This servotrack is generally a spiral-shaped groove and is provided in the substrate by means of a mould during injection-moulding or pressing. In a replication process, this groove can also be provided in a separate synthetic resin layer of, for example, a UV light-cured layer of acrylates, which is provided on the substrate. Such a groove has a pitch of 1.6 $\mu$m and a width of for example 0.6 $\mu$m.

If required, the outermost layer of the stack may be shielded from the environment by means of a protective coating of, for example, UV light-cured poly(meth)acrylate.

The invention will be explained in greater detail by means of exemplary embodiments and drawings.

DESCRIPTION OF THE PREFERRED EMBODIMENT

Exemplary Embodiment 1

Figure 1:
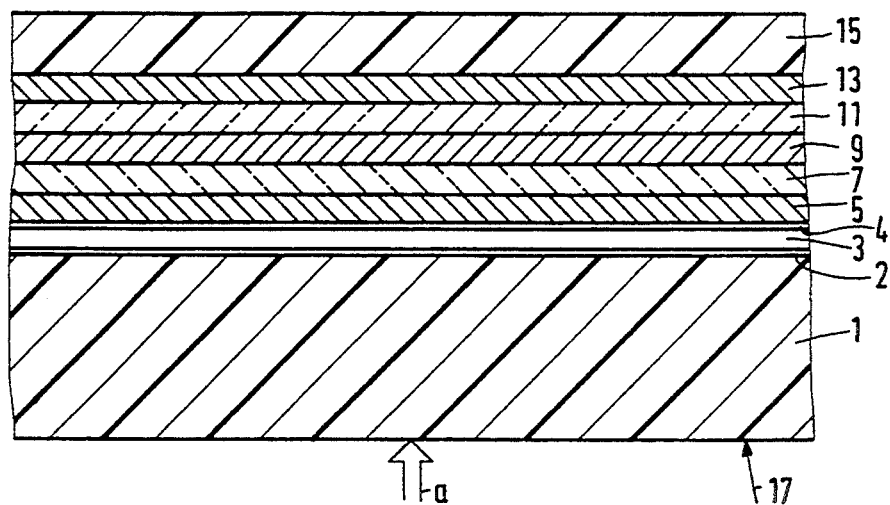
FIG. 1 diagrammatically shows a cross-section of an optical information carrier in accordance with the invention.

FIG. 1 diagrammatically shows a part of a cross-section of an optical information carrier in accordance with the invention. Reference numeral 1 denotes a disc-shaped substrate of polycarbonate having a diameter of 120 mm and a thickness of 1.2 mm. One side of the substrate is provided with a spiral-shaped servotrack (not shown) in the form of a groove. This servotrack is formed in the polycarbonate in an injection-moulding process by using a suitable mould. On the side where the servotrack is formed, the substrate is provided with a 112 nm thick auxiliary layer 3 of an alloy of selenium and 3 at. % of tellurium. The top side and the bottom side of the auxiliary layer 3 are provided with dielectric layers 2 and 4 of $Ta_2O_5$ which have a thickness of 5 nm. The dielectric layer 4 is provided with a stack of the following structure:

13 nm of Au: reflection layer 5
19 nm of $Ta_2O_5$: dielectric layer 7
20 nm of $Te_{52}Ge_{39}Sb_9$: recording layer 9
45 nm of $Ta_2O_5$: dielectric layer 11, and 100 nm of Au: reflection layer 13.

Said layers can be provided by means of sputtering or vapour deposition. After the sputtering process, the recording layer 9 is amorphous and is converted into a crystalline layer by a temperature treatment. The reflection layer 13 is provided with a 10 μm thick protective layer 15 of a UV-curable acrylate lacquer by means of spin coating. The material of the recording layer 9 is a reversible, crystalline-amorphous, phase-change material. A laser-light beam for recording, reading and, if required, erasing information enters the information carrier via the entrance face 17 of the substrate 1. This beam is diagrammatically represented by arrow a. During recording, the information carrier rotates at a constant linear velocity and by the action of a modulated laser-light beam amorphous bits in the crystalline recording layer 9 are obtained. The above layer structure results in a reflection in the crystalline and amorphous states of 65% and 20%, respectively, at room temperature. The reflection and the modulation meet the CD requirements. Thus, the above-described information carrier complies with the CD-industrial standard and can be played on a standard CD player. Moreover, by virtue of the use of the auxiliary layer 3, which melts during the write process, the absorption of the stack increases from 35% at room temperature to 55% at temperatures above 70° C., so that the laser power required for inscribing is reduced by approximately 25%. After inscribing the information carrier, the bits can be read in a conventional CD player on the basis of reflection differences. At the temperature generated by the low laser power during reading, the auxiliary layer is substantially transparent. The information can be erased, causing the amorphous bits to become crystalline. Subsequently, the information carrier can be recorded again.

Exemplary Embodiment 2

Exemplary embodiment 1 is repeated, the auxiliary layer 3 consisting of a 315 nm thick $Al_xGa_{1-x}As$ layer, where x=13 at. %. The auxiliary layer is bounded by dielectric layers 2 and 4 of $Ta_2O_5$ having a thickness of 5 nm. The dielectric layer 4 is provided with a stack of the following structure:

13 nm of Au: reflection layer 5
10 nm of $Ta_2O_5$: dielectric layer 7
22 nm of $Te_{52}Ge_{39}Sb_9$: recording layer 9
44 nm of $Ta_2O_5$: dielectric layer 11, and
100 nm of Au: reflection layer 13.

Figure 2:
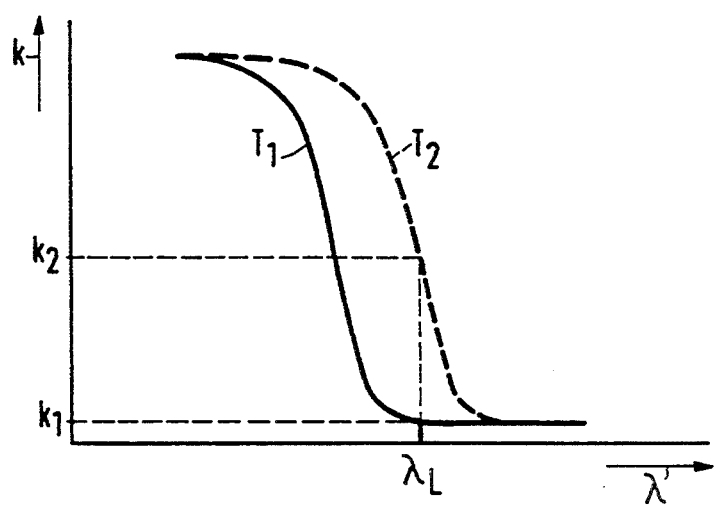
FIG. 2 shows the absorption coefficient k (in arbitrary units) of AlGaAs as a function of the wavelength $\lambda$ at the temperatures $T_1$ and $T_2$ ($T_2 > T_1$) as used for the auxiliary layer in accordance with the invention.

FIG. 2 diagrammatically shows the absorption band of this semi-conducting material. In this Figure, the absorption coefficient k (in arbitrary units) is plotted against the wavelength λ. The curve in the form of a continuous line shows the absorption band at room temperature $T_1$. At higher temperatures the absorption band shifts towards longer wavelengths. The curve represented by a dotted line shows the absorption band at, for example, 220° C.($T_2$). The value of x in $Al_xGa_{1-x}As$ is selected to be such that at the laser wavelength $\lambda_L$ used for the write process, the absorption coefficient increases from 0.0006 ($k_1$) to 0.06 ($k_2$) at this rise in temperature. The above layer structure results in a reflection in the crystalline and amorphous states of 70% and 24%, respectively, at room temperature. The reflection and the modulation meet the CD requirement. The above-described information carrier thus complies with the CD-industrial standard and can be played in a standard CD player. At the above-mentioned thickness of the auxiliary layer, the absorption of the stack increases from 30% at room temperature to 53% at temperatures above 70° C., so that the laser power required for inscribing and erasing can be reduced correspondingly. The shift of the absorption band is reversible, so that at room temperature the absorption of the auxiliary layer is substantially zero again. The unrecorded areas of the information carrier then again exhibit a high reflection of 70%. The information carrier in accordance with the invention is a recordable and, if necessary, erasable optical information carrier which complies with the CD-industrial standard (CD-E) and which, in addition, can be recorded and erased at laser powers which are lower than they would be if no auxiliary layer were used.

We claim:

1. An optical information carrier for recording, reading and erasing information by means of a laser-light beam, said optical information carrier comprising a transparent substrate having a servo track and a stack of layers, wherein the stack comprises at least one recording layer of a phase-change material and at least one reflection layer of metal, characterized in that the stack also comprises at least one auxiliary layer having the property that the light absorption has a reversible, temperature-dependent character, such that at temperatures of the auxiliary layer below 70° C. the light absorption of the auxiliary layer is zero or substantially zero and at temperatures of the auxiliary layer above 70° C. the light absorption of the stack increases to more than 35%.

2. An optical information carrier as claimed in claim 1, characterized in that the auxiliary layer comprises selenium.

3. An optical information carrier as claimed in claim 1, characterized in that the auxiliary layer comprises an alloy of selenium and 1-6 at. % of tellurium.

4. An optical information carrier as claimed in claim 1, characterized in that the auxiliary layer comprises $Al_xGa_{1-x}As$, where x=0.01-0.4.

5. An optical information carrier as claimed in claim 1, characterized in that the auxiliary layer is bounded by one or more dielectric layers.

6. An optical information carrier as claimed in claim 1, characterized in that the recording layer comprises an alloy selected from the group formed by In-Se, In-Se-Sb, In-Sb-Te, Te-Ge, Te-Se-Sb, Te-Ge-Sb and Te-Ge-Se-Sb.

7. An optical information carrier as claimed in claim 1, characterized in that a dielectric layer is present between the reflection layer and the recording layer, said recording layer being situated on the substrate side.

8. An optical information carrier as claimed in claim 7, characterized in that a second reflection layer and a second dielectric layer are located between the substrate and the recording layer, said second dielectric layer being adjacent to the recording layer.

9. An optical information carrier as claimed in claim 8, characterized in that a third dielectric layer is present between the substrate and the second reflection layer.

10. An optical information carrier as claimed in claim 1, characterized in that the auxiliary layer is present between the substrate and the stack.

11. An optical information carrier for recording, reading and erasing information by means of a laser-light beam, said optical information carrier comprising a transparent substrate having a stack of layers, wherein the stack comprises at least one recording layer of a phase-change material and at least one reflection layer of metal, characterized in that the stack also comprises at least one auxiliary layer having the property that the light absorption has a reversible, temperature-dependent character, such that at temperatures of the auxiliary layer below 70° C. the light absorption of the auxiliary layer is zero or substantially zero and at temperatures of the auxiliary layer above a given temperature the light absorption of the stack increases to more than 35%, said given temperature having a value at least equal to 70° C. and less than the temperature at which the phase-change material undergoes a change of phase during recording.

12. A carrier as claimed in claim 11, characterized in that the given temperature is approximately 220° C.

* * * * *